April 12, 1966 W. R. HICKS 3,245,632

TAPE END FASTENING MEANS FOR SOLID FLANGE REELS

Filed Aug. 19, 1963 2 Sheets-Sheet 1

INVENTOR
Walter Robert Hicks
BY Emery, Whittemore, Sandoe & Graham
ATTORNEYS.

April 12, 1966 W. R. HICKS 3,245,632

TAPE END FASTENING MEANS FOR SOLID FLANGE REELS

Filed Aug. 19, 1963 2 Sheets-Sheet 2

INVENTOR
Walter Robert Hicks
BY Emery, Whittemore
Sandoe & Graham
ATTORNEYS.

United States Patent Office 3,245,632
Patented Apr. 12, 1966

3,245,632
TAPE END FASTENING MEANS FOR SOLID FLANGE REELS

Walter Robert Hicks, Manhasset, N.Y., assignor to Reeves Industries, Inc., New York, N.Y., a corporation of New York Filed Aug. 19, 1963, Ser. No. 302,807
9 Claims. (Cl. 242—74.1)

This invention relates to the attaching of tape ends, such as magnetic recording tape, to the hubs of flanged reels.

Conventional flange reels, which are used to spool long lengths of magnetic coated tape, generally have their flanges pierced with holes or apertures. These holes reduce the total reel weight, and permit finger access through the flanges for the purpose of fastening the tape end, prior to winding a tape length on the reel hub. A slot or cavity in the peripheral face of the hub normally serves as a tape end fastening device, and several successive tape wrappings around the hub face render the fastening secure.

Recording and reproducing machines using such magnetic tape spooled in the manner described, are designed to operate at high reel rotational speeds, to accommodate tape selection winding or rewinding in the machines. For this reason, reels are generally mounted directly on the extended shafts or spindles of electric motors. As a result, in reels having pierced flanges, and which rotate rapidly, the effect of an electric fan is produced, with the spokes of the flanges moving air in the same manner as electric fan blades.

At high reel spindle speeds, air can be trapped between the layers of the wrapping tape. Following completion of tape winding or rewinding, and after storage for some time in cans or boxes at normal (and especially elevated) room temperatures, this air escapes, and the wound tape layers collapse slightly. After collapse, the tape reel no longer offers a desirable constant resistance to being unwound when it is replaced on a recorder or reproducer spindle and subjected to the relatively constant pulling action of the drive capstan and puck combination of the tape machine. Deleterious effects result, especially in the reproduction of magnetic instrumentation tapes containing recorded information bits of extremely short length, and serious read-out errors are possible.

Reproducing errors in instrumentation tape can also result from any physical deformation of the magnetic coating. Such deformations have been traced to the slots or apertures commonly machined into the peripheral reel hub face which is used to fasten the tape end. It has been demonstrated that a roll of tape wound at constant roll tension (i.e., with controlled torque at the reel spindle to produce an unvarying tension in the winding tape) produces severe compressive stresses of a radial nature in the tape reel hub. These stresses may be calculated as the sum of the total group of radial forces caused by the wrapping of a continuing series of tensed tape wrappings. Thus, the radial forces produced by a single layer of tape wound under tension must be added to the forces produced by the following tape layer, and all such forces are cumulative. Unless the reel hub is designed to withstand these forces, actual distortion of the hub shape will result.

It can be shown that these forces are especially severe when a tape layer passes over a slot or opening in the peripheral hub face. Such slots usually have comparatively sharp edges or boundaries, so that the pressure of one edge against the tape coating is distributed over a very small area, distorting the coating. Observable marks on the coating are produced on as many as 75, successive tape layers, depending on the winding tension, the diameter of the tape reel hub, and the machining characteristics of the hub slot or aperture. These marks adversely affect the reproduced fidelity of very short recorded information bits.

In order to reduce reproducing errors resulting from trapped air (produced by pierced or spoked reel flanges) and magnetic coating distortions (the result of slots in the peripheral hub face of a tape reel) magnetic tape reels must be constructed with hole-less, or solid flanges, and with hubs having peripheral faces free of any mechanical discontinuities, such as slots or similar fastening devices. Such an ideal tape reel design presents the problem of initially fastening the tape end, prior to winding on the reel hub.

It is an object of this invention to provide a construction for securing a tape on a reel having solid flanges, and having an unmarked peripheral hub face, devoid of slots or machining markings, and eliminating all arms, claws, fingers or similar elements mounted on the tape recorder or reproducer as auxiliary devices to facilitate fastening of the tape end.

It is a further object of this invention to effect the tape end fastening in the simplest manner, with a minimum of parts, and with maximum economy. The invention provides a simple gripping device for holding the end of the tape against a hub that has a continuous surface, and the gripping device is constructed so that it can be withdrawn, by an actuator on the outside of the reel, after enough layers of tape have been wrapped on the hub to hold the tape by friction.

Other objects, features and advantages of the invention will appear or be pointed out as the description proceeds.

In the drawing, forming a part hereof, in which like reference characters indicate corresponding parts in all the views.

Figures 1, 2, 3, 4, 5, 6, 7:
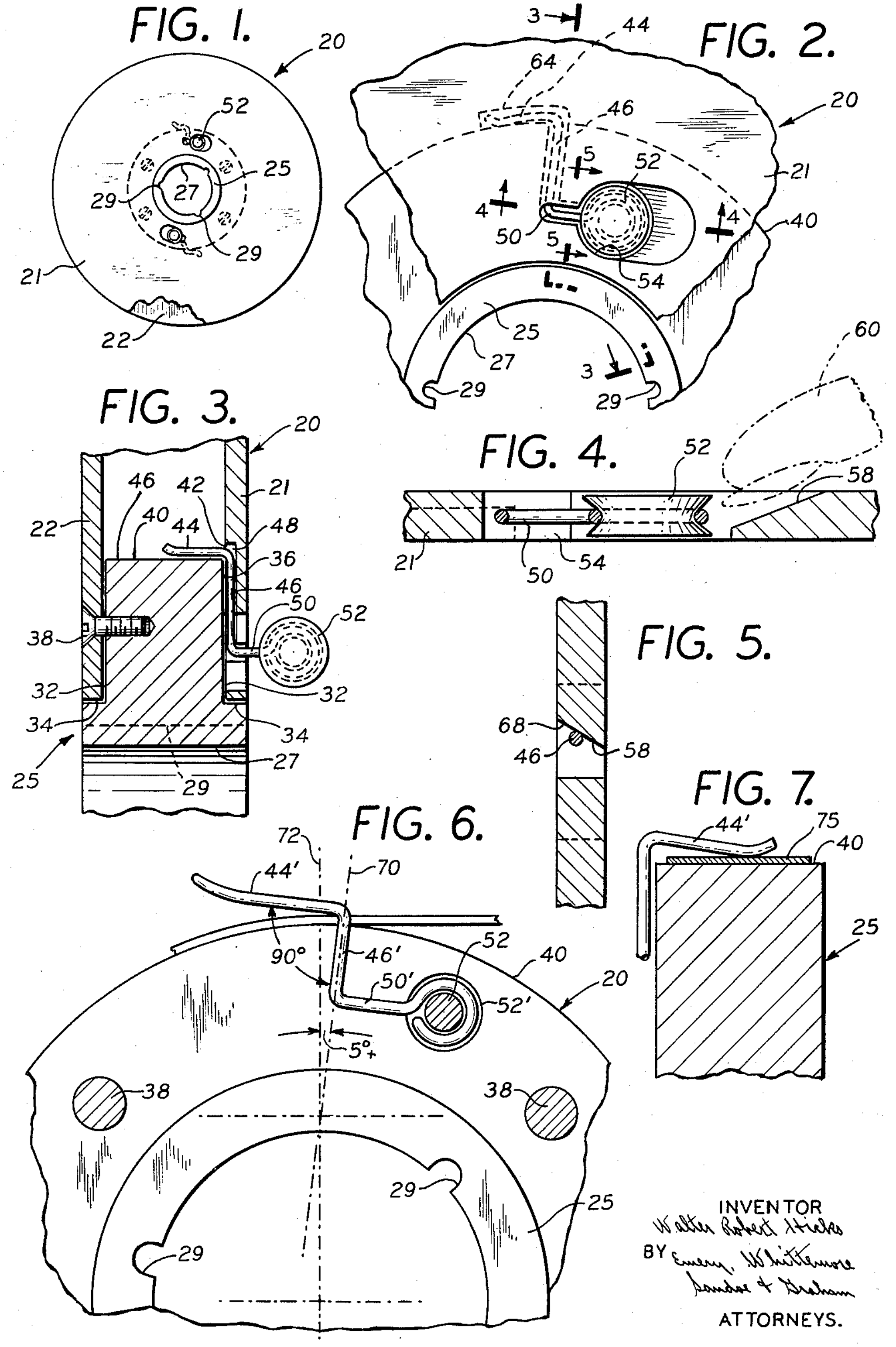
FIGURE 1 is a side elevation of a tape reel embodying this invention.
FIGURE 2 is a fragmentary, greatly enlarged view showing a portion of the structure of FIGURE 1 with some parts broken away to disclose others.
FIGURE 3 is a sectional view taken on the line 3—3 of FIGURE 2 but showing a part in a different position.
Figure 8:
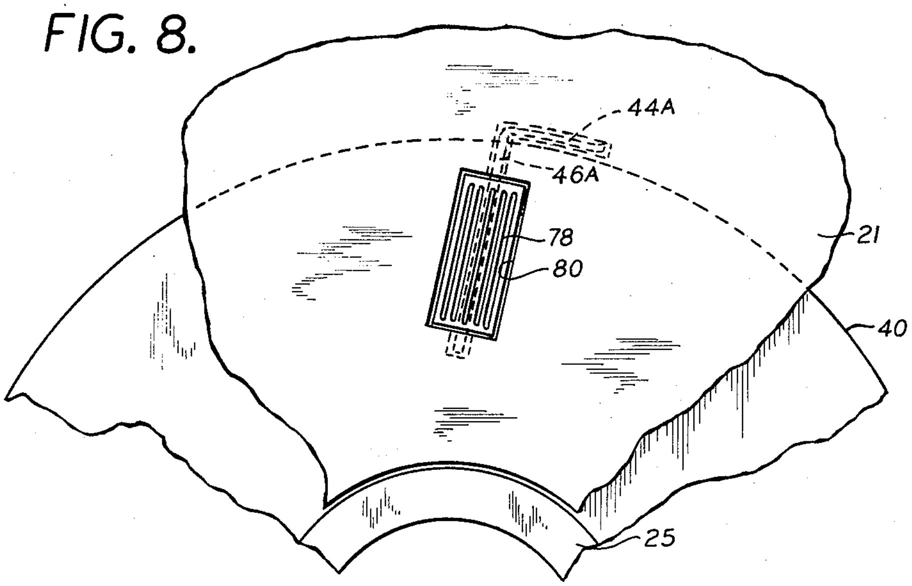
Figure 9:
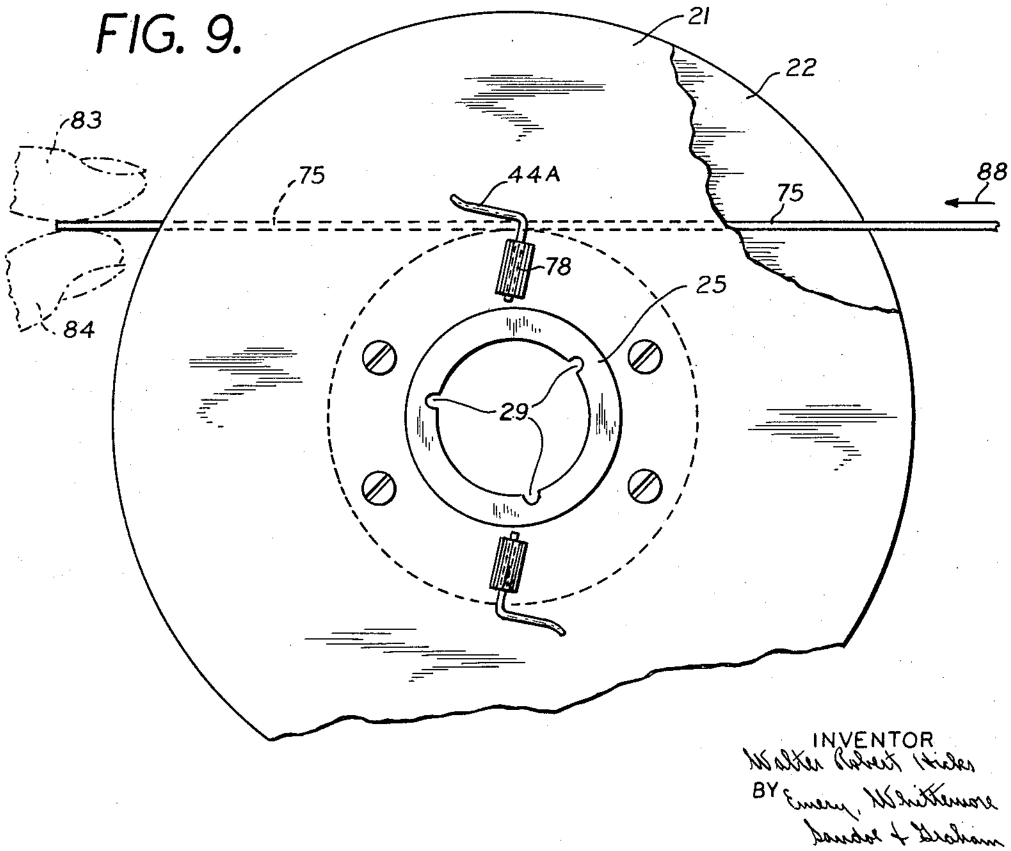

FIGURES 4 and 5 are enlarged sectional views taken on the lines 4—4 and 5—5, respectively, of FIGURE 2;

FIGURE 6 is a diagrammatic view illustrating the principle of operation of the invention;

FIGURE 7 is a fragmentary sectional view showing the way in which the tape of FIGURE 6 is held against the drum when the gripper is shifted into gripping position;

FIGURE 8 is a view similar to FIGURE 2 but showing a modified form of the invention; and FIGURE 9 is a view on a reduced scale, and partly broken away, showing the modified form of the invention illustrated in FIGURE 8.

FIGURE 1 shows a tape reel 20 having flanges 21 and 22 at opposite sides of a hub 25. There is an opening 27 through the center of the hub 25 and there are keyways 29 in the hub 25 for preventing relative rotation of the reel 20 on an axle with which the reel is used.

The hub 25 is of reduced diameter at both ends so as to provide shoulders 32 against which flanges 21 and 22 abut, as best shown in FIGURE 3.

The reduced diameter portion of the hub 25 fits a bore 34 in each of the flanges 21 and 22. The bore 34 is a close fit on the reduced diameter portion of the hub 25 so as to center the flanges 21 and 22 with respect to the axis of rotation of the hub 25.

The flanges 21 and 22 may be permanently or detachably connected to the hub 25. In FIGURE 3, the flange 21 is shown permanently connected to the hub 25 and the flange 22 is shown detachably connected to the hub 25 by screws 38 which are merely representative of detachable fastening means. The invention is particularly intended for flanges which have no openings through them beyond the peripheral portion 40 of the hub 25. The flanges 21 and 22 are shown with no openings through them, except for a small offset opening 42 located close to the peripheral surface 40 of the hub for purposes which will be described.

In order to initially hold a tape on the peripheral surface 40 of the hub until several convolutions of the tape have been wrapped on the hub, there is a gripper 44 which preferably consists of a bent wire of sufficient strength to maintain the shape to which it is originally bent. The gripper 44 extends only part way across the width of the peripheral face 44 of the hub 25. Then, following an abrupt bend in the wire, a shaft 46 is formed. This shaft is located in a groove 48 formed in the inside surface of the flange 21. The groove 48 serves as a bearing in which the shaft 46 is free to rotate.

At the radial inner end of the shaft 46, there is a crank arm 50 which extends at substantially right angles to the shaft 46 and which has its end wrapped around a button 52. There is an opening 54 in the flange 21 into which the crank 50 and button 52 fit when in retracted position, as shown in FIGURES 2 and 4.

The opening 54 has a sloping wall 58 which provides access for an operator's finger 60 when it is desirable to move the button 52 out of the opening 54 and into the extended position shown in FIGURE 3. It will be understood that movement of the button 52 from the position shown in FIGURES 2 and 4 to the position shown in FIGURE 3 moves the crank 50 through approximately 90° and rotates the shaft 46 about its longitudinal axis through the same angle. This causes the gripper 44 to move from a position parallel to the flange 21 into the position shown in FIGURE 3 where the gripper extends across a portion of the face of the peripheral surface 40 of the hub 25.

There is a circumferential extension 64 (FIGURE 2) of the opening 48 for housing the gripper 44 within the dimensional limits of the flange 21 so that when the button 52 is in retracted position in the opening 54, the gripper 44 is within the extension 64 and out of the path of the tape which wraps on the hub 25 between the flanges 21 and 22.

In the illustrated construction, therefore, the gripper 44, shaft 46 and crank 50 are of one piece construction being made from a single piece of wire, as previously explained. The crank 50 and shaft 46 constitute motion transmitting connections between the button 52 of the actuator and the gripper 44. The end of the gripper 44 remote from the shaft 46 preferably diverges slightly from the peripheral surface 40 of the hub; and in order to have the gripper and the button 52 of the actuator remain in their retracted positions when placed there, the portion of the opening along the crank 50 has a sloping wall 68, as shown in FIGURE 5, so as to hold the crank 50 against movement from its retracted position. Some bending of the crank 50 is necessary in order to pass over the high part of the sloping wall 68.

In order to have dynamic balance for the reel 20, there is a gripper 44 on each side of the hub 25, and there are identical actuating means for each of the grippers. This structure is set 180° apart around the hub 25, as shown in FIGURE 1, and this obtains the necessary dynamic balance so that the reel 20 can rotate at high speed without vibration.

In order to have the gripper move away from the surface of the hub as the gripper swings through its angle of movement, the shaft 46 is located at an acute angle to the radius of the hub. FIGURE 6 shows a slightly modified construction of the gripper and its actuator; but this figure illustrates clearly the angle at which the shaft extends with respect to a radius of the hub.

In FIGURE 6 the modified shape of a gripper is indicated by the reference character 44' and corresponding parts to those illustrated in FIGURE 3 are designated by the same reference characters as in FIGURE 3 but with a prime appended. The shaft 46' extends along a longitudinal axis 70 which is at 5° or more to the radius 72 of the hub 25. With the gripper 44' in its retracted position, as shown in FIGURE 6, the gripper extends away from the peripheral surface 40 of the hub 25; but when the button 52' is pulled out and the shaft 46' is rotated through 90° it will be apparent that the gripper 44' will move into a position more nearly parallel to the peripheral surface 40 of the hub 25. In the construction shown in FIGURE 6, the gripper 44' is shaped so that it not only moves into a parallel position but by the time it has shifted through its full 90° of angular movement, it is in a position where it converges toward the peripheral surface 40, as shown in FIGURE 7. This causes the gripper 44' to contact with the tape 75 at a region near the center of the tape.

FIGURES 8 and 9 show a modified form of the invention in which the gripper, designated by the reference character 44A is attached to one end of a shaft 46A and this shaft is secured to a cylindrical roller 78 with a grooved peripheral surface for facilitating rotation of the roller by a finger of the attendant using the reel. The roller 78 fits into a groove 80 formed in the flange 21 and in the adjacent portion of the hub 25. No part of the roller 78 extends beyond the surface of the reel flange 21, but the flange 21 has angular reliefs along opposite edges of the groove 80 to aid finger actuation of the roller 78, by a finger of the attendant.

FIGURE 9 shows the principle of operation of the invention. Although shown applied to the modified form of FIGURE 8 this applies also to the other forms of the invention. An attendant grips the tape 75 at one end with his fingers 83 and 84, and pulls the tape across the hub 25 while the gripper 44A is out of the path of the tape 75. The roller 78 is then operated to turn the shaft 46A and to bring the gripper 44A into contact with the tape 75. With the tape 75 only lightly held by the gripper 44A, the tape is released from the fingers 83 and 84 and is pulled to the right in FIGURE 9 so that only a short length of the tape extends beyond the gripper 44A.

The roller 78 is then turned to its limit of travel to grip the tape 75 with full force; and the reel is then rotated counter-clockwise until several convolutions are wrapped about the hub 25. The roller is again turned, but in a direction to withdraw the gripper from between the first and second convolutions of the tape. This requires some lifting of the outer convolution or convolutions, but the tape wraps snugly again when the reel is rotated counter-clockwise with some little tension on the run of tape approaching from the right in the direction of the arrow 88. Friction of the inner convolution of tape against the peripheral surface of the hub, together with the snubbing action of the second and any subsequent convolutions of tape, prevent the tape from slipping on the hub 25 and cause the tape to wrap on the reel as the rotation continues.

The preferred embodiments of the invention have been illustrated and described, but changes and modifications can be made and some features can be used in different combinations without departing from the invention as defined in the claims.

What is claimed is:

1. A tape reel for spooling tape at high rotational speeds without fanning air between the layers of tape including a hub having a peripheral surface, flanges at both ends of the hub, the flanges being substantially imperforate outward beyond the peripheral surface of the hub, a gripper for holding an end portion of a tape on the hub until several convolutions of the tape have been wrapped around the hub, the gripper being angularly movable about an axis extending in substantially the same direction as a radius of the reel and into a position out of the path of the tape, and an actuator at an accessible location on the reel, means for connecting the gripper to the actuator and by which the actuator operates the gripper for withdrawing the gripper from between the convolutions of the tape to a position out of the path of the tape as the tape wraps on the reel.

2. A tape reel for spooling tape at high rotational speeds without fanning air between the layers of tape including a hub having a peripheral surface, flanges at both ends of the hub, the flanges being substantially imperforate outward beyond the peripheral surface of the hub, a gripper for holding an end portion of a tape on the hub until several convolutions of the tape have been wrapped around the hub, and an actuator at an accessible location on the reel, means for connecting the gripper to the actuator and by which the actuator operates the gripper for withdrawing the gripper from between the convolutions of the tape to a position out of the path of the tape as the tape wraps on the reel, said means comprising a shaft connecting the gripper and the actuator, the gripper being attached to the outer end of the shaft that extends along an end surface of the hub with a substantial radial component of direction, and the actuator being a manually operated element connected to the shaft at the inner end of the shaft and having a finger gripping portion at the outer end of said manually operated element.

3. The tape reel described in claim 2 characterized by the actuator being a crank arm connected to the shaft at the inner end of the shaft and having a button at the outer end of the crank arm.

4. The tape reel described in claim 3 characterized by the gripper, shaft, and at least a portion of the button, being of one-piece construction and being made of a wire that has bends at the juncture of the gripper with the shaft and at the juncture of the shaft with the crank arm.

5. The tape reel described in claim 3 characterized by a groove on the inside face of one of the flanges from just beyond the peripheral surface of the hub to a location nearer to the center of the hub, the groove being of a length to provide a bearing for the shaft, and a recess in the outside surface of the grooved flange for receiving the crank arm button.

6. The tape reel described in claim 5 characterized by the gripper extending at substantially right angles to the shaft and the groove being in a plane normal to the axis of rotation of the reel but at an acute angle to the radius of said one flange.

7. The tape reel described in claim 6 characterized by the groove being at an acute angle at least as great as 5° to the radius of the flange.

8. The tape reel described in claim 7 characterized by the gripper extending only part way across the width of the peripheral surface of the hub and being parallel to the peripheral surface along most of the length of the gripper, but having a shortened portion remote from the shaft and that diverges from the peripheral surface of the hub.

9. The tape reel described in claim 1 characterized by an opening through one of the flanges, the opening having its outer end nearer to the axis of the reel than is the inner end of the opening and an intermediate portion of the opening extending in a direction having a radial component, the actuator being exposed by the outer end of the opening for operation from outside of the flange and having its motion-transmitting connections to the gripper extending through said opening.

References Cited by the Examiner

UNITED STATES PATENTS

| | | | |
|---|---|---|---|
| 1,172,349 | 2/1916 | Frappier | 242—74.1 |
| 1,366,182 | 1/1921 | Hokanson. | |
| 2,859,920 | 11/1958 | Flahan | 242—74.1 |
| 3,096,950 | 7/1963 | Gutterman | 242—74 |

FOREIGN PATENTS

| | | | |
|---|---|---|---|
| 14,237 | 1913 | Great Britain. | |

MERVIN STEIN, *Primary Examiner.*

STANLEY N. GILREATH, *Examiner.*